F. REICHMANN.
WEIGHING DEVICE.
APPLICATION FILED MAY 12, 1916.
1,393,828.
Patented Oct. 18, 1921.
2 SHEETS—SHEET 1.
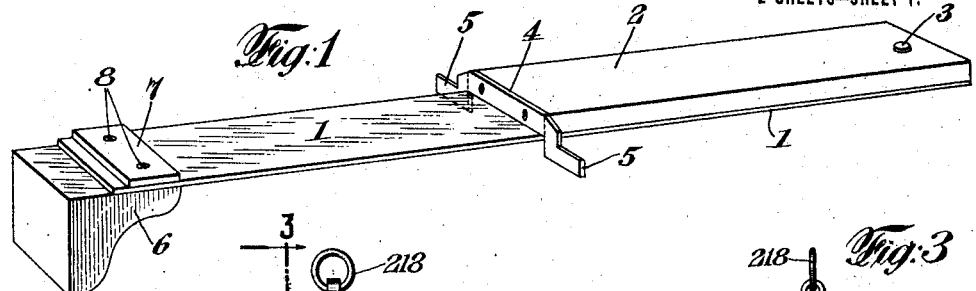
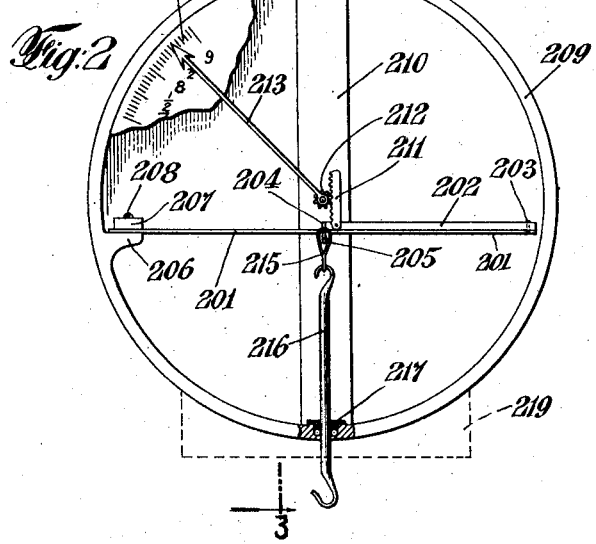
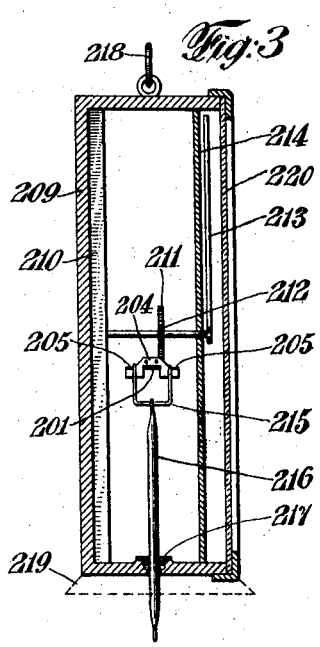
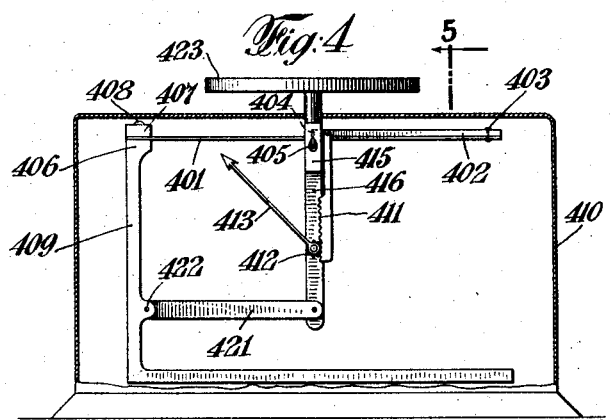
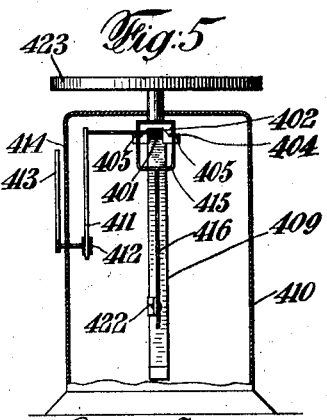
Inventor
Fritz Reichmann
By his Attorneys
Prindle Wright & Small F. REICHMANN.
WEIGHING DEVICE.
APPLICATION FILED MAY 12, 1916.
1,393,828.
Patented Oct. 18, 1921.
2 SHEETS—SHEET 2.
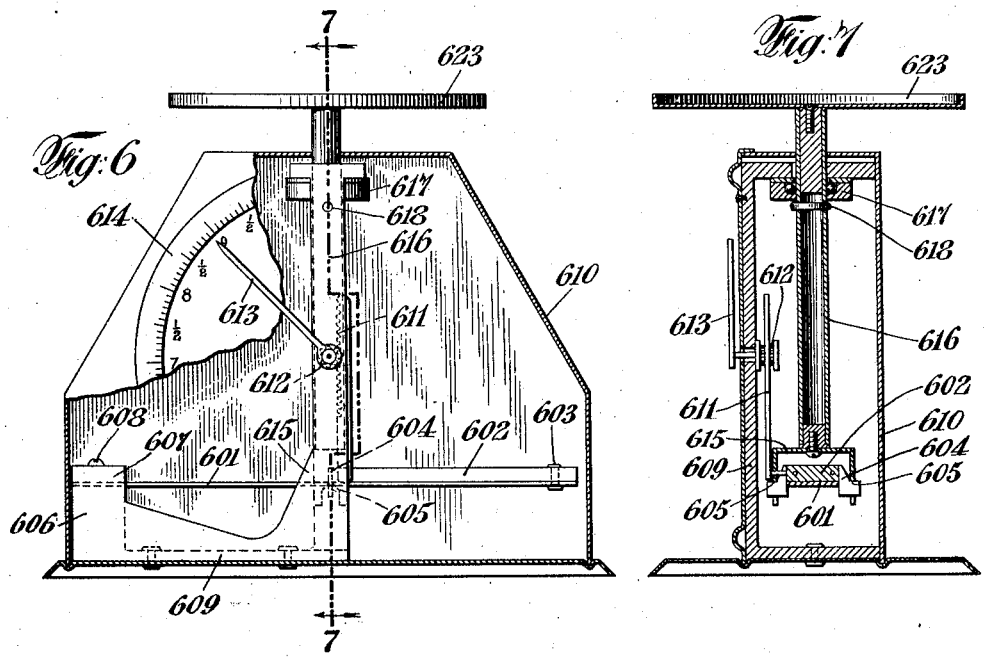
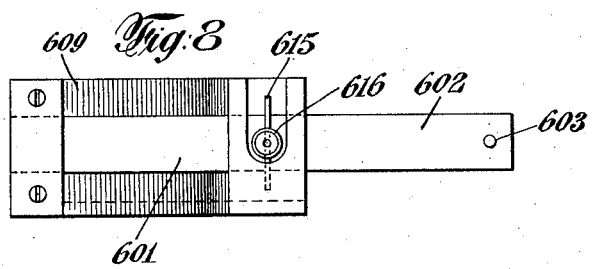

UNITED STATES PATENT OFFICE.

FRITZ REICHMANN, OF NEW YORK, N. Y.

WEIGHING DEVICE.

1,393,828.  Specification of Letters Patent.  Patented Oct. 18, 1921.

Application filed May 12, 1916. Serial No. 96,971.

*To all whom it may concern:*

Be it known that I, FRITZ REICHMANN, of New York, in the county of New York, and in the State of New York, have invented a certain new and useful Improvement in Weighing Devices, and do hereby declare that the following is a full, clear, and exact description thereof.

My invention relates to a weighing device and has for its object to provide a device which will not vary with thermal changes, but which will indicate correctly the weight of articles applied thereto irrespective of differences in temperature conditions.

A further object of my invention is to provide a weighing device which is easy to adjust, and which will remain in adjustment when once the parts are fixed in adjusted position.

A further object of my invention is to provide a weighing device of simple and strong construction, which will not get out of order, and which will not lose its accuracy through constant use.

Other and further objects of my invention will be apparent from the following description thereof.

For the purposes of illustration, the invention is shown applied to ordinary weighing scales of various types, but it is to be understood that it is not to be limited to the particular types of scales chosen to illustrate the same, the invention comprising a weighing device adapted to indicate correctly the weight of articles applied thereto irrespective of thermal changes, and to be applicable for use wherever its advantages may be desirable or advantageous.

Reference is made to the accompanying drawings, wherein:

Figure 1 is a perspective of one embodiment of the force-resisting member;

Fig. 2 a front elevation of the invention applied to a so-called hanging pan scale or to the head of a platform scale, with the dial plate broken away except as to a small portion;

Fig. 3 a section taken on line 3—3 of Fig. 2 looking in the direction of the arrows, but with the pointer in vertical position;

Fig. 4 a front elevation of the invention applied to a so-called box scale, with the front face removed;

Fig. 5 a section taken on line 5—5 of Fig. 4 looking in the direction of the arrows, but with the pointer in vertical position;

Fig. 6 a front elevation of the invention applied to a so-called platform scale, with the dial plate broken away except as to a small portion;

Fig. 7 a section on the line 7—7 of Fig. 6 looking in the direction of the arrows, but with the pointer in vertical position; and Fig. 8 a plan of the frame in the embodiment shown in Figs. 6 and 7, with the platform removed.

Similar reference characters refer to similar parts throughout the drawings.

The application of my invention to the three types of weighing scales illustrated is not intended in any way as a limitation of the manner in which the invention may be applied, as it is applicable to various other forms of scales not illustrated, and to any use for which its advantages make it desirable or advantageous.

One form of a weighing device embodying my invention is shown in Fig. 1 of the drawings. Reference character 1 indicates an elastic strip suitably supported at one end; and reference character 2, a thermal expansion piece of less length than elastic strip 1, suitably secured to the other and unsupported end of elastic strip 1. It will be noted in the embodiment illustrated, that elastic strip 1 and thermal expansion piece 2 are secured together at one end only, so that the unsecured end of thermal expansion piece 2 is free to move longitudinally with reference to elastic strip 1 when changes in temperature cause the parts to expand or contract. Any desired fastening means may be utilized to secure together strip 1 and piece 2, such as rivets 3. Thermal expansion piece 2 should have a different thermal coefficient of expansion, and preferably a different variation in elasticity, from elastic strip 1. Both the elastic strip 1 and thermal expansion piece 2 may be of any material fulfilling the desired conditions. A strip of tempered steel may be used for elastic strip 1 and a piece of aluminum may be used for thermal expansion piece 2, it being understood that the proportions may be varied in accordance with the materials used, and that the invention is not limited to the materials mentioned.

In the embodiment described above, the weight is applied to the device at a point adjacent the free end of thermal expansion piece 2. For convenience of application, particularly when the device is used in a scale, an attachment 4 may be secured to the end of thermal expansion piece 2, having thereon knife edges 5. The weight may be applied directly or through the intervention of suitable mechanism.

It will be evident that changes in elongation due to changes in temperature will be compensated by the device described, so that like weights applied to knife edges 5 will encounter the same resistance, irrespective of temperature. Viewed in one aspect, the point at which weight is applied to elastic strip 1 varies according to the changes induced in said strip by varying temperatures, although the invention is not limited to this single aspect thereof. An increase in temperature, for example, will cause an elongation of elastic strip 1, but this same increase in temperature also will cause an elongation of thermal expansion piece 2, so that the free end of thermal expansion piece 2 and the knife edges 5 carried thereby, always will be in such position as to compensate for varying temperatures.

The end of elastic strip 1 opposite to that to which thermal expansion piece 2 is secured may be mounted in any desired manner, and preferably adjustably mounted. In the embodiment illustrated, a support 6 is shown to which elastic strip 1 is secured by a plate 7, the parts being held together in any desired manner, as by screws 8. To adjust the scales, screws 8 are loosened and elastic strip 1 moved in or out until the proper adjusted position is reached, and then strip 1 secured firmly in proper position by tightening screws 8.

An application of the invention to a weighing scale is shown in Figs. 2 and 3, wherein is illustrated a so-called hanging pan scale which also is adapted to be used as the head of a platform scale. Elastic strip 201, thermal expansion piece 202, rivets 203, attachment 204, knife edges 205, support 206, plate 207, and screws 208, are similar to the corresponding pieces designated by reference characters 1 to 8, inclusive, of Fig. 1, as described above. In this embodiment a metal frame 209 is disclosed, having a cross bar 210. To thermal expansion piece 202 is secured a rack 211, which is adapted to mesh with a pinion 212 connected with a pointer 213, the end of which is adjacent a scale 214. On knife edges 205 rests a connecting member 215, on which is hung a supporting rod 216, which passes through a ball bearing 217 adjacent an opening in the bottom of the frame. Ball bearing 217 maintains supporting rod 216 in proper alinement. A pan or other device to support articles to be weighed may be secured to the bottom of supporting rod 216. When used as a hanging pan scale, the ring 218 at the top of the frame 209 will be used in well-known manner; and when used as a platform scale, the stand 219 shown in dotted lines will be utilized. A glass front 220 (Fig. 3) exposes the pointer and scale to view.

Another application of the invention to a weighing scale is shown in Figs. 4 and 5, wherein is illustrated a so-called box scale. Elastic strip 401, thermal expansion piece 402, rivets 403, attachment 404, knife edges 405, support 406, clamping plate 407, and screws 408 are similar to the corresponding pieces designated by reference characters 1 to 8, inclusive, of Fig. 1, as described above. In this embodiment, the frame 409 and the weighing mechanism are inclosed by a casing 410. To thermal expansion piece 402 is secured a rack 411, which is adapted to mesh with a pinion 412 connected with a pointer 413, the end of which is adjacent a scale 414. On knife edges 405 rests a connecting member 415, to which is attached a supporting rod 416 extending through the top of the casing. A different method of maintaining supporting rod 416 in proper alinement from that illustrated in Figs. 2 and 3 is shown in this embodiment, consisting of a guiding rod 421, one end of which is connected to any suitable place on supporting rod 416, and the other end of which is connected to any fixed member, such as an ear 422 on frame 409. Many equivalent structures may be used if desired. On supporting rod 416 is secured a pan 423, or any other suitable device adapted to hold articles to be weighed.

Another application of the invention to a weighing scale is shown in Figs. 6, 7, and 8, wherein is illustrated a platform scale. Elastic strip 601, thermal expansion piece 602, rivets 603, attachment 604, knife edges 605, support 606, clamping plate 607, and screws 608 are the same as the corresponding pieces designated by reference characters 1 to 8, inclusive, of Fig. 1 described above. In this embodiment, a frame 609 is illustrated adapted to support the weighing mechanism, the whole being inclosed in a casing 610 which is independent of the weighing mechanism. The top piece of frame 609 may be made forked for convenience in casting. To thermal expansion piece 602 is secured a rack 611, which is adapted to mesh with a pinion 612, connected with a pointer 613, the end of which is adjacent a scale 614. A connecting member 615 engages knife edges 605, to which member is attached a supporting rod 616, which passes through an alinement-maintaining ball bearing 617, screwed to the under side of the upper piece of the frame 609, and thence passing through an opening in the casing. On supporting rod 616 is secured a pan 623 or any other suitable device, adapted to receive articles to be weighed.

Many modifications will be apparent to those skilled in the art, my invention not being limited to the particular parts chosen to illustrate my invention, but comprising a weighing device adapted to compensate for differences in temperature and to indicate weights applied thereto, with uniformity and accuracy irrespective of the thermal expansion of the force-resisting member.

Having described one embodiment of my invention, what I claim and desire to protect by Letters Patent of the United States is:

1. In a weighing device, the combination of means to offer resistance to the movement produced by weights applied thereto comprising a force-resisting member and means to vary the point of application of said weights on said force-resisting member longitudinally thereof so that said force-resisting member will give identical resistance to like weights under varying degrees of temperature.

2. In a weighing device, the combination of means to offer resistance to the movement produced by weights applied thereto comprising a force-resisting member, a thermal expansion piece thereon adapted to support said weights, said member and piece being so arranged that changes in said member due to changes in temperature are compensated by said piece.

3. In a weighing device, the combination of means to offer resistance to the movement produced by weights applied thereto comprising a force-resisting member, and means to vary the resistance of said member comprising a thermal expansion piece thereon having a different thermal coefficient of expansion from said member.

4. In a weighing device, the combination of means to offer resistance to the movement produced by weights applied thereto comprising a force-resisting member, and means to vary the resistance of said member comprising a thermal expansion piece thereon having capacities for thermal changes opposing and compensating the thermal changes in said member.

5. In a weighing device, the combination of means to offer resistance to the movement produced by weights applied thereto comprising a flexible force-resisting member, and means to vary the resistance of said member comprising a thermal expansion piece thereon having a different degree of elasticity from said member.

6. In a weighing device, the combination of means to offer resistance to the movement produced by weights applied thereto, and means to vary the resistance of said member comprising a thermal expansion piece thereon having a different degree of elasticity and a different thermal coefficient of expansion from said member.

7. In a weighing device, the combination of means comprising a flexible force-resisting member, a thermal expansion piece parallel therewith, and means to secure said member and said piece together so that the movements of said parts due to changes in temperature will be in opposite directions.

8. In a weighing device, the combination of means to offer resistance to the movement produced by weights applied thereto comprising a force-resisting member comprising an elastic strip and a temperature-compensating device riveted thereto and adapted to prevent resistance variation from temperature changes.

9. In a weighing device, the combination of means to offer resistance to the movement produced by weight applied thereto comprising a force-resisting member comprising an elastic strip, and means to vary automatically in accordance with temperatures the point at which weights are applied to said strip.

10. In a weighing device, the combination of means to offer resistance to the movement produced by weight applied thereto comprising a force-resisting member comprising an elastic strip, and a parallel thermal expansion piece thereon of less length than said strip, adapted to prevent resistance variation from temperature changes.

11. In a weighing device, the combination of means to offer resistance to the movement produced by weight applied thereto comprising a force-resisting member comprising an elastic strip, a thermal expansion piece of less length than said elastic strip adapted to prevent resistance variation from temperature changes, and means to secure together said pieces adjacent one end of each.

12. In a weighing device, the combination of means to offer resistance to the movement produced by weight applied thereto comprising a force-resisting member comprising an elastic strip, a thermal expansion piece of less length than said elastic strip, means to secure said devices together adjacent their ends, and means on the free end of said thermal expansion piece adapted to receive the application of weights.

13. In a weighing device, the combination of means to offer resistance to the movement produced by weight applied thereto comprising a force-resisting member comprising an elastic strip, a thermal expansion piece of less length than said elastic strip, means to secure said devices together adjacent their ends, and means comprising a knife edge secured to the free end of said thermal expansion piece adapted to receive the application of weights.

14. In a weighing device, the combination of means to offer resistance to the movement produced by weight applied thereto comprising a force-resisting member comprising an elastic strip, a thermal expansion piece attached to said strip adapted to prevent resistance variation from temperature changes, and means to support said strip so that it can expand or contract independently of said force-resisting member.

15. In a weighing device, the combination of means to offer resistance to the movement produced by weight applied thereto comprising a force-resisting member comprising an elastic strip, a thermal expansion piece attached to said strip adapted to prevent resistance variation from temperature changes, and means to support said strip at one end thereof.

16. In a weighing device, the combination of means to offer resistance to the movement produced by weights applied thereto comprising a force-resisting member comprising an elastic strip, a thermal expansion piece attached to said strip, and means to support said strip adjustably comprising a support, a securing plate, and means to fasten the free end of said strip between said support and said securing plate.

17. In a weighing device, the combination of a frame having upper and lower extensions, a casing secured to said frame, an elastic strip secured to said frame, a piece of less length than said strip secured to the free end of said strip and extending toward the secured end of said strip, knife edges on the free end of said piece, a pan, means to support said pan on said knife edges, a ball bearing secured to the upper extension of said frame through which said supporting means passes and is guided, and means to register the deflection of said strip when any weight is placed in said pan.

18. In the weighing device, the combination of a force-resisting element comprising an elastic metal strip, means to support one end of said strip, a piece of material of a different thermal coefficient of expansion from said strip due to changes in temperature secured to the free end of said strip and extending toward the secured end of said strip, an attachment carrying knife edges secured to the free end of said piece, a weight supporting device, means to support said device on said knife edges, and means to maintain in alinement said supporting means.

19. In a weighing device, the combination of means to offer resistance to the movement produced by weights applied thereto comprising a force-resisting member, and means connected therewith and movable thereon so that said first-named means will offer identical resistance to like weights under varying degrees of temperature.

In testimony that I claim the foregoing I have hereunto set my hand.

FRITZ REICHMANN.